US012042795B2

(12) United States Patent
Boehm et al.

(10) Patent No.: US 12,042,795 B2
(45) Date of Patent: Jul. 23, 2024

(54) CARTRIDGE WITH LIQUID PACK

(71) Applicant: Roche Diagnostics Operations, Inc., Indianapolis, IN (US)

(72) Inventors: Christoph Boehm, Viernheim (DE); Thorsten Brueckner, Schriesheim (DE); Sascha Lutz, Neustadt (DE); Alexander Keuchel, Limburgerhof (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 707 days.

(21) Appl. No.: 17/099,970

(22) Filed: Nov. 17, 2020

(65) Prior Publication Data

US 2021/0069715 A1 Mar. 11, 2021

Related U.S. Application Data

(63) Continuation of application No. PCT/EP2019/073913, filed on Sep. 9, 2019.

(30) Foreign Application Priority Data

Sep. 11, 2018 (EP) .................................... 18193711

(51) Int. Cl.
*B01L 3/00* (2006.01)

(52) U.S. Cl.
CPC ......... *B01L 3/523* (2013.01); *B01L 2200/026* (2013.01); *B01L 2200/04* (2013.01);
(Continued)

(58) Field of Classification Search
CPC ............... B01L 3/523; B01L 2200/026; B01L 2200/04; B01L 2200/0689; B01L 2200/141; B01L 2200/16; B01L 2300/042; B01L 2400/0478; B01L 2200/027; B01L 2300/0609; B01L 2300/0809;
(Continued)

(56) References Cited

U.S. PATENT DOCUMENTS 9,190,015 B2 11/2015 Kim
9,616,427 B2 4/2017 Tan et al.
(Continued)

FOREIGN PATENT DOCUMENTS

DE 202014104510 U1 1/2016
DE 102015226417 A1 6/2017
(Continued)

OTHER PUBLICATIONS

International Search Report issued Oct. 4, 2019, in Application No. PCT?EP2019/073913, 3 pp.

*Primary Examiner* — Samuel P Siefke
(74) *Attorney, Agent, or Firm* — Woodard, Emhardt, Henry, Reeves & Wagner, LLP

(57) ABSTRACT

A cartridge including a structural part with a hole surrounded at least partially by a recess, so that a wall is formed that separates the hole from the recess. The cartridge includes a liquid pack, wherein the liquid pack comprises a surrounding seal portion and a liquid containing portion. The liquid pack is arranged at least partially in the hole, in that a circumferential outer line of the seal portion protrudes over the hole.

20 Claims, 5 Drawing Sheets

(52) U.S. Cl.
CPC . *B01L 2200/0689* (2013.01); *B01L 2200/141* (2013.01); *B01L 2200/16* (2013.01); *B01L 2300/042* (2013.01); *B01L 2400/0478* (2013.01)

(58) Field of Classification Search
CPC ............... B01L 2400/0481; B01L 3/52; B01L 3/502715; B65D 75/32
See application file for complete search history.

(56) References Cited

U.S. PATENT DOCUMENTS

| | | | |
|---|---|---|---|
| 9,678,065 | B2 | 6/2017 | Sugarman et al. |
| 9,731,297 | B2 | 8/2017 | Glezer et al. |
| 9,753,003 | B2 | 9/2017 | Lauks et al. |
| 9,782,270 | B2 | 10/2017 | Wickham |
| 9,797,006 | B2 | 10/2017 | Niemz et al. |
| 9,808,802 | B2 | 11/2017 | Dothie et al. |
| 9,863,837 | B2 | 1/2018 | Rule et al. |
| 2011/0186466 | A1* | 8/2011 | Kurowski ......... B01L 3/502715 220/4.01 |
| 2012/0180882 | A1 | 7/2012 | Malik et al. |
| 2013/0020202 | A1 | 1/2013 | Feiglin et al. |
| 2013/0343955 | A1 | 12/2013 | Doyle et al. |
| 2014/0255275 | A1 | 9/2014 | Barry et al. |
| 2016/0175835 | A1 | 6/2016 | Taylor et al. |
| 2016/0263577 | A1 | 9/2016 | Ismagilov et al. |
| 2017/0291747 | A1 | 10/2017 | Janta et al. |

FOREIGN PATENT DOCUMENTS

| | | | |
|---|---|---|---|
| EP | 3213513 | A1 | 10/2017 |
| JP | 2005-096866 | | 4/2005 |
| JP | 2006-208837 | A | 8/2006 |
| JP | 2006-308366 | | 11/2006 |
| JP | 2011-513712 | | 4/2011 |
| JP | 2011-524313 | | 9/2011 |
| WO | 2008/155723 | A1 | 12/2008 |
| WO | 2009/152952 | A1 | 12/2009 |
| WO | 2010/091246 | A2 | 8/2010 |
| WO | 2011/004653 | A1 | 1/2011 |
| WO | 2013/015822 | A1 | 1/2013 |
| WO | 2013/135713 | A1 | 9/2013 |
| WO | 2015/084458 | A2 | 6/2015 |
| WO | 2015/185763 | A1 | 12/2015 |
| WO | 2016/014771 | A1 | 1/2016 |
| WO | 2016/049557 | A1 | 3/2016 |
| WO | 2016/077341 | A2 | 5/2016 |

* cited by examiner

CARTRIDGE WITH LIQUID PACK

CROSS-REFERENCE TO RELATED APPLICATIONS

This application is a continuation of International Patent Application No. PCT/EP2019/073913, filed 9 Sep. 2019, which claims the benefit of European Patent Application No. 18193711.1, filed 11 Sep. 2018, the disclosures of which are hereby incorporated herein by reference in their entirety.

TECHNICAL FIELD

The present disclosure relates to an arrangement to open a liquid compartment. In particular, a cartridge with a liquid pack is provided. This cartridge can be configured to be inserted into a device. The device could be any kind of device able to handle a liquid.

BACKGROUND

Cartridges are used in many fields to separate a disposable part of a machine from a non-disposable part. These cartridges somehow interact with the non-disposable part to achieve a result, e.g., a measurement result or a printed product, or a liquid with and additive, etc.

Often cartridges are part of a point of care diagnostic system for near patient testing. These kind of cartridges are, e.g., described in WO 2016/049557, WO 2016/014771, WO 2008/155723, U.S. Pat. Nos. 9,190,015, 9,863,837, 9,797,006, 9,808,802, 9,731,297, 9,753,003, 9,782,770, 9,678,065, 9,616,427.

WO2013/135713, WO 2015/185763 or EP 3231513 discloses cartridges for point of care measurement systems using a centrifugal force to conduit a liquid through the cartridge.

For all these cartridges it is useful to have a compartment with a liquid. A cartridge with a liquid pack in form of a blister is, e.g., disclosed in U.S. Pat. No. 9,638,663. This cartridge contains a minimum of one blister pack capable of storing necessary liquids for diagnostic assays. The blister provides hermetic storage and physical protection of the liquid components, minimizing degradation of the reagents, which can take place. There may be two blister packs, one containing a wash solution and the other containing an electrochemical substrate. Blister packs and containing sealed liquid may be affixed to a recess in the top part by a ring shape adhesive film. For blister packs, an external mechanical actuator applies downward pressure to the top of the individual packs until compressed. For example, this may be a pneumatic or hydraulic piston. The blisters sit in recess and a sharp molded feature punctures the bottom of the blister upon this external pressure. The liquid from the blister is then forced through an opening.

BRIEF SUMMARY

It is against the above background that the embodiments of the present disclosure provide certain unobvious advantages and advancements over the prior art. In particular, the inventors have recognized a need for improvements in a cartridge with a liquid pack.

Although the embodiments of the present disclosure are not limited to specific advantages or functionality, it is noted that the present disclosure provides a cartridge with a liquid pack wherein the liquid pack is easy to assemble to the cartridge and the liquid in the liquid pack can be filled into the cartridge with less risk to contaminate a non-disposable part of a device which interacts with the cartridge.

In accordance with an embodiment of the disclosure, a cartridge is provided comprising a structural part with a hole surrounded at least partially by a recess so that a wall is formed which separates the hole from the recess, and the cartridge comprises a liquid pack, wherein the liquid pack comprises a surrounding seal portion and a liquid containing portion and the liquid pack is arranged at least partially in the hole, characterized in that a circumferential outer line of the seal portion protrudes over the wall so that a portion of the outer line is arranged above the recess.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1A:
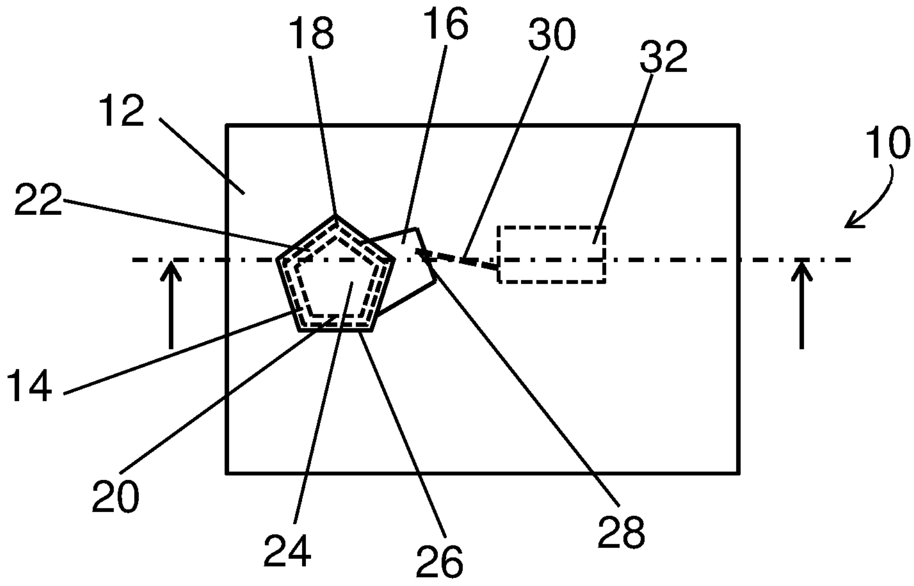
FIG. 1A is a view on a structural part with a liquid pack of a cartridge.
Figure 1B:
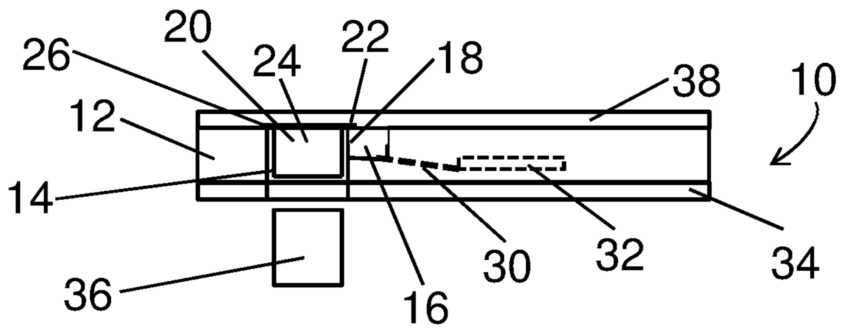
FIG. 1B is a side view of a cut of the cartridge parts shown in FIG. 1A with a cover part.
Figure 1C:
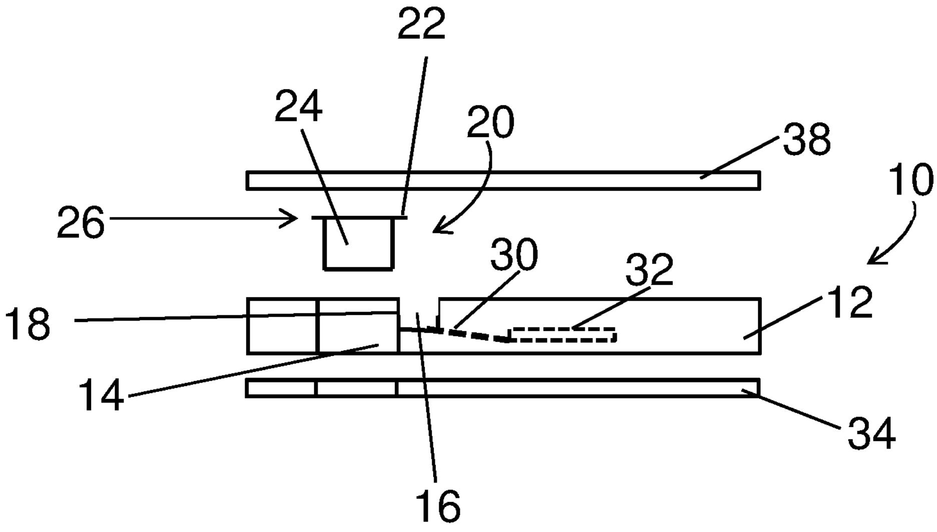
FIG. 1C is an exploded view of the cut shown in FIG. 1B.
Figure 1D:
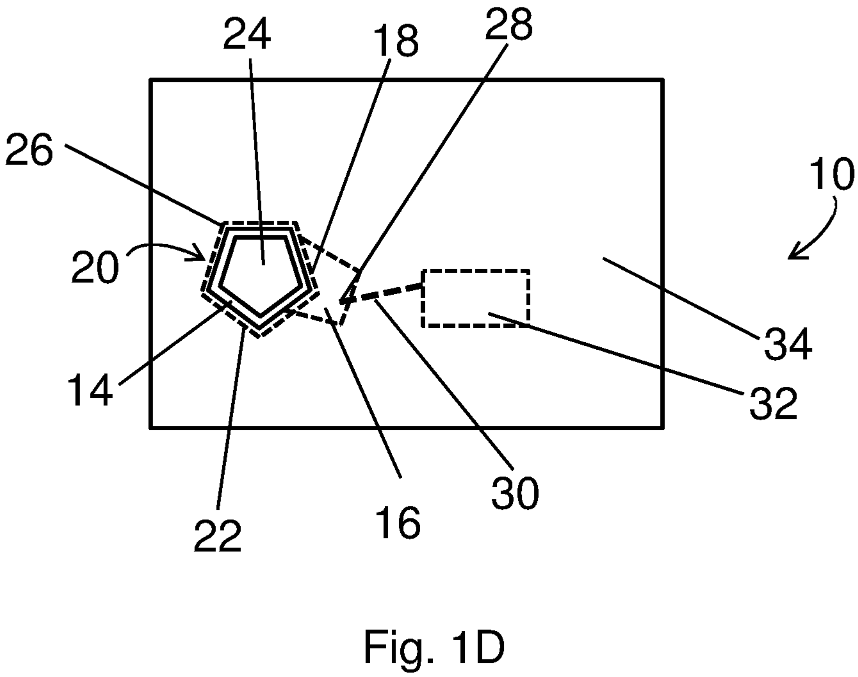
FIG. 1D is the bottom view of the parts of the cartridge as shown in FIG. 1A.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

A first aspect of the present disclosure concerns a cartridge which comprises a structural part with a hole surrounded at least partially by a recess so that a wall is formed which separates the hole from the recess. A liquid pack of the cartridge comprises a surrounding seal portion and a liquid containing portion. The seal portion surrounds the liquid containing portion to contain the liquid in the liquid pack. The liquid pack is arranged at least partially in the hole characterized in that a circumferential outer line of the seal portion protrudes over the wall so that a portion of the outer line is arranged above the recess. This means that the boundary of the seal portion has a bigger extension as the hole and the wall in the direction perpendicular to an axis defined by the elongation of the opening of the hole. This assures that the liquid pack can be easily placed in the hole. In addition, this allows an opening of the liquid pack without dropping liquid out of the liquid pack into the opening of the hole. The liquid pack is arranged in the cartridge so that it seals the opening of the hole from the recess.

The circumferential outer line of the seal portion of the liquid pack is the outer boundary line of the seal portion. The inner boundary line separates the seal portion from the liquid portion of the liquid pack.

A further aspect of the inventive cartridge is that the wall comprises a guiding recess. This guiding recess provides an opening channel for the liquid pack because at the guiding recess the seal portion is not so tightly fixed in the cartridge. The guiding recess is formed into the wall so that a force of the cartridge holding the liquid pack in the cartridge is lower at the guiding recess. So at the guiding recess the opening of the seal portion is guided to a pre-determined position within the cartridge to allow the opening of the seal portion at a determined position above the recess.

A further aspect of the inventive cartridge is that the hole is surrounded entirely by the recess. This allows for more reliable collecting of the liquid in the recess.

An additional aspect of the cartridge is that the liquid pack contains a volume of a liquid, wherein the recess is able to collect this volume. This ensures that the liquid can be collected and stored in the recess before the liquid needs to be transferred to a further structure in the structural part.

Another aspect of the cartridge is that the liquid pack, in particular its liquid portion, has a form which form fits into the hole. This allows for easy assembly during manufacturing. This form fit does not mean that the liquid pack copies the form of the hole. For instance, a half dome also form fits into a cylindrical hole. Form fits in this sense means that the liquid pack can be placed on the hole so that it nearly cannot move anymore in the direction perpendicular to the axis defined by the elongation of the opening of the hole. The remaining movement is limited by manufacturing accuracy.

A further aspect of the cartridge is that the hole that has a shape of a cylinder cut out, in particular a cylinder. This allows for easy manufacturing of the cartridge.

Another aspect of the cartridge is that the portion of the liquid pack filled with liquid forms a spherical cap, in particular a hemisphere. This is easy to manufacture and assemble.

A further aspect of the cartridge is that the recess comprises a hole to a channel of the structural part. This allows for further transportation of the liquid via pressure, rotation or capillary forces.

An additional aspect of the cartridge is that the channel is connected to a functional part of the cartridge. This allows use of the liquid in the liquid pack at the desired structure of the structural part.

Another aspect of the cartridge is that the cartridge comprises a cover part, which is fixed to the structural part, so that the liquid pack is fixed at least partially in the hole. The cover part prohibits that the liquid pack can drop out of the hole. This allows for easy handling of the cartridge. Alternatively, this functionality can be provided by the non-disposable part of the device the cartridge is adapted to be placed in. For example, the cartridge will be placed into the non-disposable part and either carefully with the liquid pack already placed in the hole or afterwards the liquid pack will be placed into the hole of the structural part. Afterwards some kind of cover forms the non-disposable part will cover the structural part so that the liquid pack is safely placed in the hole.

A further aspect of the cartridge is that between the end of the wall faced to the cover part and the cover part there is a distance between 20 to 1000 μm in particular between 50 to 500 μm. On the one hand this distance needs to be small enough to safely secure the liquid pack in the structural part. On the other hand, this distance needs to be big enough so that the sealed portion can pop up to let the liquid pass. A third condition for this distance is that it should be small enough so that the liquid will not be able to flow or drop into the opening of the hole.

One aspect of an inventive liquid handling device comprising a cartridge as described above is that the liquid handling device further comprises a piston, which can be actuated by a drive of the liquid handling device to press against the liquid pack in the cartridge from the side opposite to the cover part. This piston is part of the non-disposable part of the liquid handling device. It allows squeezing the liquid out of the liquid pack into the recess of the structural part.

In accordance with another embodiment of the disclosure, the liquid handling device is characterized in that the piston has a circumferential surface which at least nearly form fits into the hole. This provides for an emptying of the liquid pack as good as possible to not to waste any liquid.

A further aspect of the liquid handling device is that the liquid handling device comprises a rotor wherein the cartridge can be placed in the rotor so that the liquid of the liquid pack can be transported in the structural part by rotating the rotor with a further drive of the liquid handling device. Therefore, the liquid can be transported to the desired place in the cartridge with rotating forces.

Usually a liquid pack consists of a flat-top cylindrical shape that may be made from a cold formable material whereby a molded, defined shape is pressed upon the cold formable film as to take on the design of the mold. The cold formable material may be an aluminum foil that is laminated on either side by a thin polymeric film. The cavity that results is filled with liquid reagent solutions needed for conducting an assay. For instance, the liquid pack contains a wash solution or a substrate solution.

The cavity can provide, e.g., 50 μL to 3 mL of volume and the liquid pack can be under-filled or altered in its dimensions as to adjust the volume capacity. Once the cavity is filled, it can be hermetically sealed by placing a thin layer of material on top of the cavity and applying pressure and/or heat. Alternatively, or in addition, the sealing can be provided by stamping the sealing portion with different kind of grid like patterns. Furthermore, also ultra-sonic welding is feasible to produce a sealing portion.

The sealing material may be an aluminum film whereby the sealed side is coated with a glue-like lacquer that activates upon pressure and/or heat. The other side may have a protective lacquer that is not disrupted by heat. The use of aluminum provides ultra-low vapor transmission so that no liquid escapes or enters once sealed. But also plastic materials or polymer materials in combination with aluminum coatings can be used for the liquid pack.

Further optional features and embodiments of the disclosure will be provided in more detail in the subsequent description of typical embodiments. Therein, the respective optional features may be realized in an isolated fashion as well as in any arbitrary feasible combination, as the skilled person will realize. The scope of the disclosure is not restricted by the typical embodiments. The embodiments are schematically depicted in the Figures. Therein, identical reference numbers in these Figures refer to identical or functionally comparable elements.

In order that the embodiments of the present disclosure may be more readily understood, reference is made to the following examples, which are intended to illustrate the disclosure but not limit the scope thereof.

FIGS. 1A-1D presents one possible embodiment of the inventive concept.

FIG. 1A shows a top view of a structural part 12 with a liquid pack 20 of a cartridge. The structural part 12 comprises a hole 14. Besides the hole 14 the structural part comprises a recess 16. The recess 16 and the hole 14 are separated by a wall 18. A liquid pack 20 is placed with its liquid containing portion 24 in the hole 14. A seal portion 22 surrounds the liquid containing portion 24.

The liquid pack 20 can consist of a flat-top cylindrical shape that may be made from a cold formable material whereby a molded, defined shape is pressed upon the cold formable film as to take on the design of the mold. The cold formable material may be an aluminum foil that is laminated on either side or on one side by one or several thin polymeric films. The cavity that results is filed with a liquid needed for conducting an operation of the cartridge. The cavity can provide 50 μL to 30 mL of volume and the liquid pack can be under-filled or altered in its dimensions as to adjust the volume capacity.

Once the cavity is filled, it can be hermetically sealed by placing a thin layer, i.e., a foil, of material on top of the cavity and applying pressure and/or heat or ultrasonic welding. The sealing material may be an aluminum film whereby the sealed side is coated with a glue-like lacquer that activates upon pressure and/or heat. The other side may have a protective lacquer that is not disrupted by heat. The use of aluminum provides ultra-low vapor transmission so that no liquid escapes or enters once sealed. Sealing is also possible by, e.g., ultra-sonic welding, or gluing. Other material than aluminum can be used, e.g., plastics, other metal sheets with thicknesses between 10 μm and 200 μm. In particular, these materials are coated to ameliorate the welding or to minimize vapor transmission, e.g., like PET which is coated with silicon dioxide via plasma separation processes. Further a coating may be required to reduce material diffusion into the stored liquid or to prevent chemical reactions between liquid and sealing material.

In the embodiment shown in FIGS. 1A-1D, the hole 14 has a pentagonal footprint. The liquid containing portion 24 of the liquid pack 20 of this embodiment is cylinder shaped with a pentagonal footprint, which is smaller than the footprint of the hole 20. So the liquid containing portion 24 of the liquid pack 20 fits into the hole 14. The seal portion 22 of the liquid pack 20 has a pentagonal circumferential outer line 26 or border which projects above the border of the hole 14 circumferentially. Therefore, the liquid pack 20 is held in the horizontal plane of FIG. 1B and cannot fall through the hole. A cover part 38 of the cartridge prohibits that the liquid pack 20 can fall out of the hole 14, when the cartridge is turned.

A further cover 34 protects the opposite side with respect to the cover part 38 of the cartridge 10. The further cover 34 comprises a cut-out which fits with the hole 14, so that a piston 36 of a liquid handling device (not shown) can be introduced into the hole 14.

If the cartridge 10 is placed in a liquid handling device, the piston 36 can then press the liquid back against the cover part 38. The cartridge can be either placed in a liquid handling device so that the piston drives from underneath into the cartridge against the liquid pack or from above depending of the design of the liquid handling device. The liquid handling device comprises therefore an appropriate control and drive means such as a microcontroller or equivalent and a motor to drive the piston 36 the desired amount with the desired force.

Finally, the seal portion 22 will break at the desired area of the recess 16 and the liquid of the liquid pack 20 will be pressed or flow into the recess 16. The swollen sealing area seals at the same time the recess 16 from the hole 14, so that the liquid in the recess 16 cannot flow into the hole 14. This avoids contamination or pollution of the area of the hole 14 and hence of the piston 36 or further parts of the liquid handling device.

From recess 16 the liquid can further flow via a channel 30 into a functional part 32 of the cartridge. There the liquid will be used for its intended purpose.

Figure 2A:
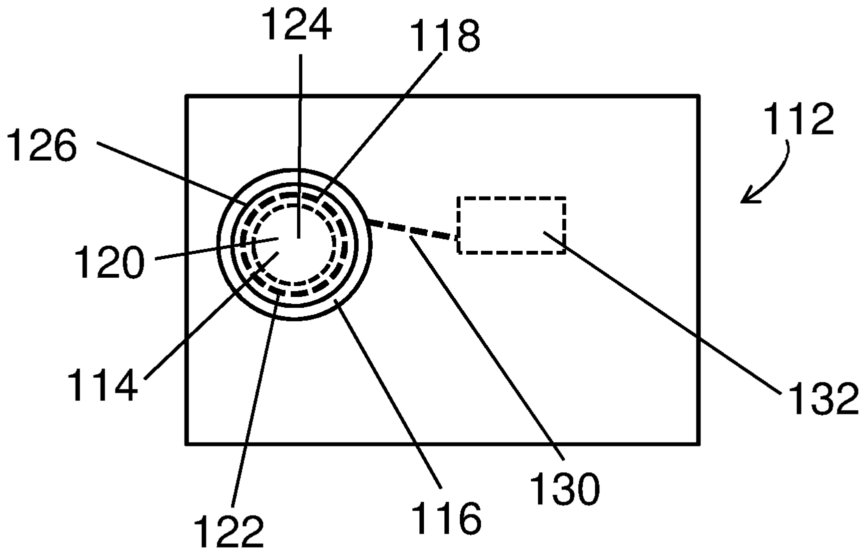
FIG. 2A is a top view of another embodiment of the cartridge parts.

FIG. 2A shows the top view of a further embodiment of a structural part 112 with a liquid pack 120. This embodiment differs from the embodiment shown in FIGS. 1A-1D in the form of the hole 114, recess 116, wall 118 and liquid pack 120. The hole 114 and the liquid pack 120 have a cylindrical shape with a circular footprint. The liquid pack 120 has an essentially cylindrical liquid containing portion 124 and a flat ring-shaped seal portion.

The liquid pack is built out of two foils sealed together at the sealing portion like the liquid pack 20 of the embodiment described according to FIGS. 1A-1D. The circumferential outer line 126 has a corresponding circular shape as the outer border of the seal portion 122. The wall 118 separating the recess 116 forming the hole 114 has a circular shape.

The recess 116 surrounds the whole hole 114 forming a ring shaped hutch. The circumferential outer line is placed between the wall 118 and the outer borderline of the recess 116. Therefore, it is not relevant on which exact position the seal portion 122 of the liquid pack 120 will break or peel off when the two foils of the liquid pack delaminate due to the force some kind of piston introduces to the liquid in the liquid pack 120 by pressing the liquid pack 120 against the cover (not shown in FIG. 2) as can be deduced accordingly from FIG. 1B.

Finally, a channel 130 connects the recess 116 with a functional part 132. The fluid of the fluid pack 20 can be transferred through the channel 130 to the functional part 132 to fulfill whatever purpose.

Figure 2B:
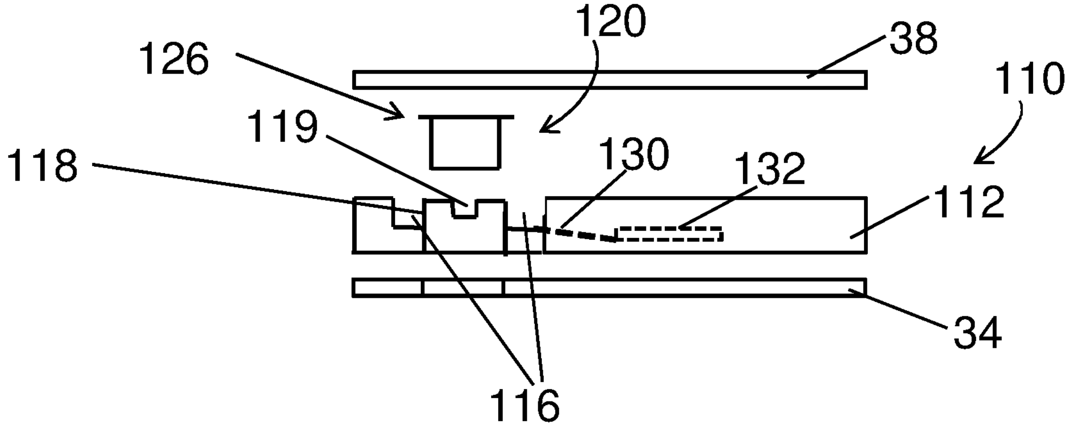
FIG. 2B is a cut view of a modified design of the embodiment shown in FIG. 2A.
Figure 3A:
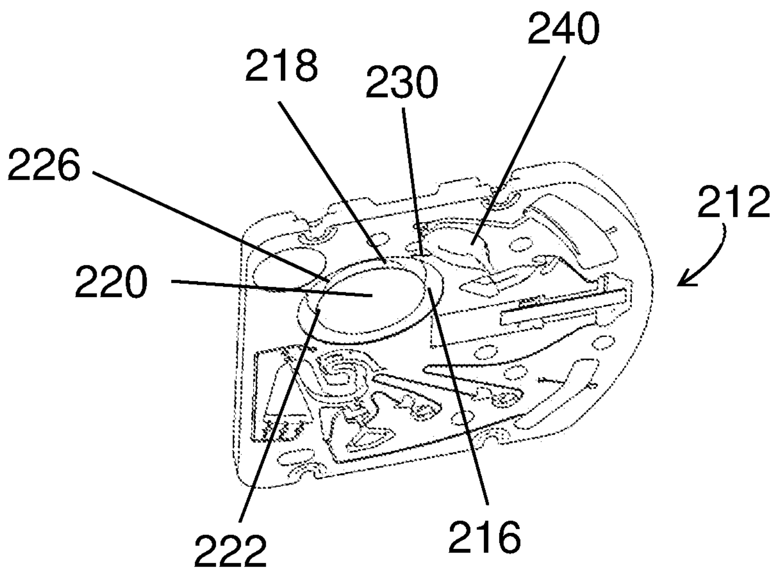
FIG. 3A is a perspective view from below from still another structural part with liquid pack.
Figure 3B:
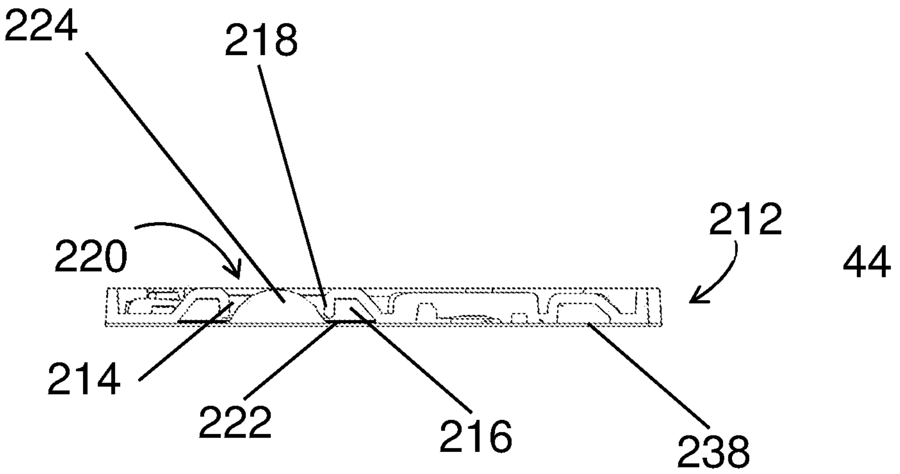
FIG. 3B is a cut view from the parts shown in FIG. 4 plus a cover part.
Figure 3C:
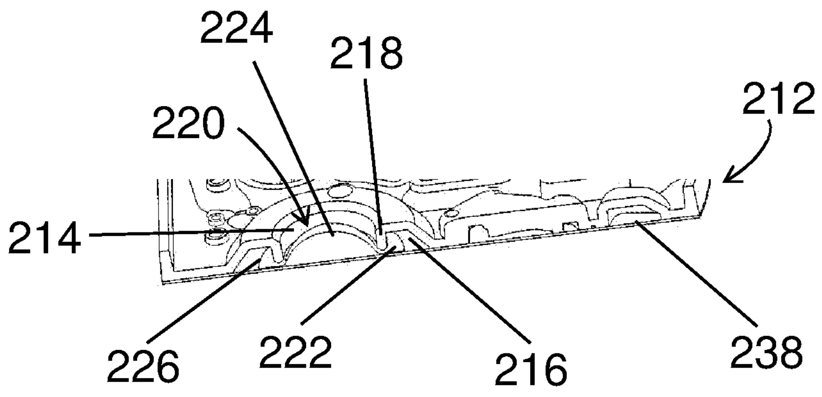
FIG. 3C is a perspective view of the cut shown in FIG. 5.
Figure 3D:
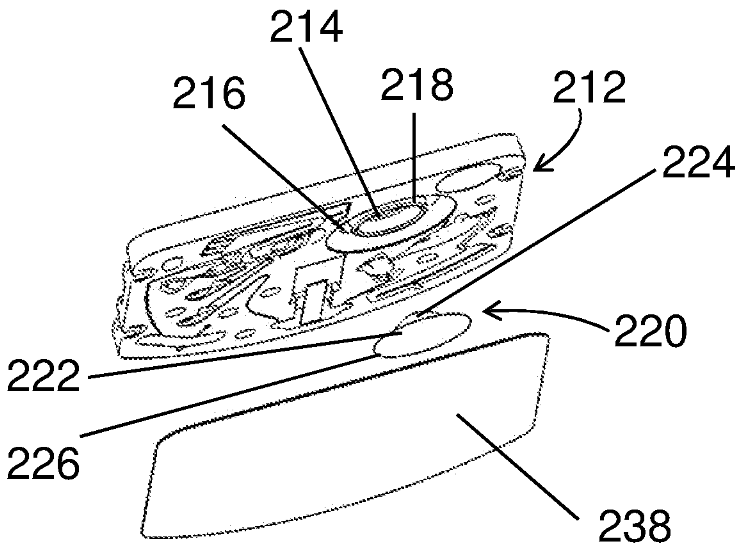
FIG. 3D is an explosive perspective view of the parts shown in FIGS. 5 and 6.

FIG. 2B shows a slightly modified design of the embodiment shown in FIG. 2A. The circumferential wall 118 has a guiding recess 119. This guiding recess 119 supports the opening of the liquid pack 20 at a desired point in space into recess 116. The guiding recess can have, e.g., a V-shape, a u-shape, a half circle shape or a rectangular shape. The liquid pack 20 is held in the cartridge by holding the sealing portion tightly between the cover part 38 and the circumferential wall 118. Thus, the opening of the seal portion 122, i.e., the detaching of the foils will be guided at the guiding recess to open the liquid pack 120 at the radial prolongation of the guiding recess 119 at the outer line 126.

In a further not shown embodiment this guiding recess can also be placed so that it supports the opening in a recess 16 which is not circumferential as shown in the embodiment of FIGS. 1A-1D.

FIGS. 3A-3D show an embodiment of the disclosure as a rotatable cartridge with a metering chamber for analyzing a biological sample. Details of the further functionalities of this cartridge can be found, e.g., in WO 2015/185763, the disclosure of which is hereby incorporated herewith by reference.

In this embodiment, the structural part 212 forms a ring shaped recess 216. The liquid pack 220 has a hemispherical liquid containing portion 224 surrounded by a flat ring shaped sealing portion 222. When the liquid pack 220 is placed in the cylindrical hole 214 the hemisphere form fits with its greatest diameter into the hole 214. The sealing portion 222 overlaps the wall 218, so that the outer line 226 of the sealing portion is arranged above the recess. If a piston of a liquid handling device will press the hemisphere against the cover part 238, the sealing portion 222 will blow up until the two laminated foils will separate at one point and the liquid will flow into the recess 216.

The swollen liquid portion 222 will seal the recess 216 against the hole 214 to avoid back flow or contamination of the hole area and hence the liquid handling device.

The liquid can then flow through a channel 230 into an aliquoting chamber 240 by rotating the cartridge. The channel is placed so that the inlet of the channel 230 from the recess 216 is at the farthest point of the recess from an axis of rotation. This allows that the whole amount of liquid is transferred from the recess 216 into channel 230.

REFERENCE NUMBERS

10, 110, 210 cartridge
12, 112, 212 structural part
14, 114, 214 hole
16, 116, 216 recess
18, 118, 218 wall
119 guiding recess
20, 120, 220 liquid pack
22, 122, 222 seal portion
24, 124, 224 liquid containing portion
26, 126, 226 circumferential outer line
28 hole to a channel
30, 130, 230 channel
32 functional part
34 further cover
36 piston
38, 238 cover part
240 aliquoting chamber

What is claimed is:

1. A cartridge comprising:
- a liquid pack comprising a cup-shaped, liquid containing portion and a seal portion sealing with and enclosing the liquid containing portion;
- a structural part defining a hole receiving at least a portion of the liquid containing portion of the liquid pack, the hole being surrounded at least partially by a recess, the structural part forming a wall which separates the hole from the recess; and
- a cover part attached to the structural part such that the liquid pack is fixed at least partially in the hole;
- the wall extending from the structural part toward the cover part and having an end surface faced toward the cover part, the end surface of the wall forming a gap between the end surface of the wall and the cover part, and at least a portion of the seal portion being received in the gap,
- wherein upon the application of pressure on the liquid pack the seal portion opening within the gap and releasing liquid into the recess,
- the seal portion having a circumferential outer line which protrudes over the end surface of the wall so that a portion of the seal portion is received between the end surface of the wall and the cover part and the outer line is arranged above the recess.

2. The cartridge of claim 1, wherein the hole is surrounded entirely by the recess.

3. The cartridge of claim 1, wherein the wall comprises a guiding recess.

4. The cartridge of claim 1, wherein the liquid pack contains a volume of a liquid, wherein the recess is configured to collect the volume.

5. The cartridge of claim 4 wherein the volume of the recess is equal to or greater than the volume of the liquid.

6. The cartridge of claim 1 wherein the liquid containing portion has a form which form fits into the hole.

7. The cartridge of claim 1 wherein the hole has a shape of a cylinder cut out.

8. The cartridge of claim 7 wherein the hole has a shape of a cylinder.

9. The cartridge of claim 1 wherein the liquid containing portion of the liquid pack forms a spherical cap.

10. The cartridge of claim 9 wherein the liquid containing portion of the liquid pack forms a hemisphere.

11. The cartridge of claim 1 wherein the recess comprises a hole to a channel of the structural part.

12. The cartridge of claim 11 wherein the channel is connected to a functional part of the cartridge.

13. The cartridge of claim 1 wherein between the end surface of the wall and the cover part there is a distance of 50 to 1000 μm.

14. The cartridge of claim 1 wherein between the end of the wall and the cover part there is a distance between 50 to 500 μm.

15. A liquid handling device comprising:
- a cartridge according to claim 1;
- a piston configured to press against the liquid pack in the cartridge from the side opposite to the cover part; and
- a drive actuatable to press the piston against the liquid pack.

16. The liquid handling device according to claim 15, wherein the piston has a circumferential surface which form fits into the hole.

17. The liquid handling device according to claim 15, and further comprising:
- a rotor wherein the cartridge can be placed in the rotor so that the liquid of the liquid pack can be transported in the structural part by rotating the rotor a further drive of the liquid handling device.

18. The cartridge of claim 1, wherein the hole is partially surrounded by the recess, the seal portion not surrounded by the recess being received between and forming a seal between the structural part and the cover part.

19. The cartridge of claim 1, wherein the liquid containing portion is surrounded by a flat ring-shaped sealing surface and the seal portion of the liquid pack is configured to open within the gap to release liquid upon application of pressure onto the liquid pack.

20. A cartridge comprising:
- a liquid pack comprising a cup-shaped, liquid containing portion and a seal portion sealing with and enclosing the liquid containing portion, the liquid containing portion being surrounded by a flat ring-shaped sealing surface and the seal portion of the liquid pack being configured to open within the gap to release liquid upon application of pressure onto the liquid pack;
- a structural part defining a hole receiving at least a portion of the liquid containing portion of the liquid pack, the hole being surrounded at least partially by a recess, the structural part forming a wall which separates the hole from the recess; and
- a cover part attached to the structural part such that the liquid pack is fixed at least partially in the hole;

the wall extending from the structural part toward the cover part and having an end surface faced toward the cover part, the end surface of the wall forming a gap between the end surface of the wall and the cover part, and at least a portion of the seal portion being received in the gap, wherein upon the application of pressure on the liquid pack the seal portion opening within the gap and releasing liquid into the recess, the seal portion having a circumferential outer line which protrudes over the end of the wall so that a portion of the seal portion is received between the end surface of the wall and the cover part and the outer line is arranged above the recess.

* * * * *